Figure 1:
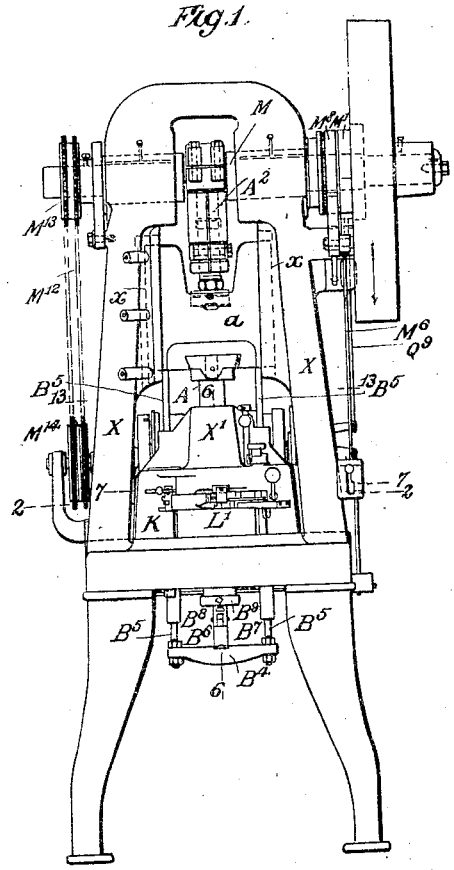

BEST AVAILABLE COPY

F. H. PIERPONT.
MATRIX STAMPING OR PUNCHING MACHINE.
APPLICATION FILED APR. 22, 1910.

1,042,475.

Patented Oct. 29, 1912.
15 SHEETS—SHEET 1.

Witnesses
Thomas Durant
Halbert P. Brown

Inventor
Frank H. Pierpont
by Church & Church
his Attorneys

F. H. PIERPONT.
MATRIX STAMPING OR PUNCHING MACHINE.
APPLICATION FILED APR. 22, 1910.

1,042,475.

Patented Oct. 29, 1912.
15 SHEETS—SHEET 5.

Witnesses
Thomas Durant
Halbert P. Brown

Inventor
Frank H. Pierpont
by Church & Church
his Attorneys

F. H. PIERPONT.
MATRIX STAMPING OR PUNCHING MACHINE.
APPLICATION FILED APR. 22, 1910.
1,042,475.
Patented Oct. 29, 1912.
15 SHEETS—SHEET 7.
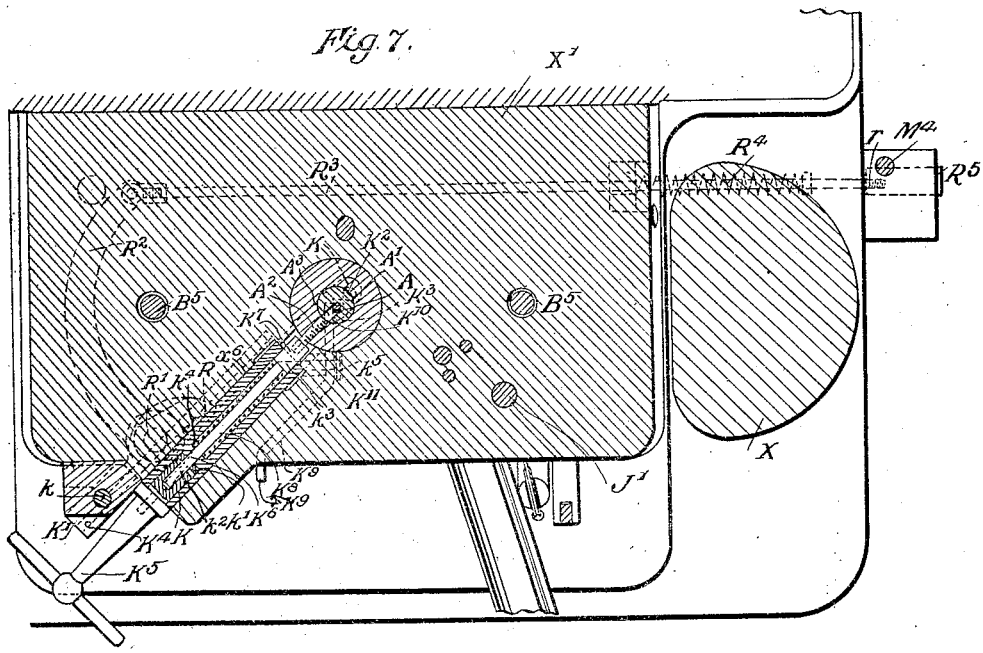
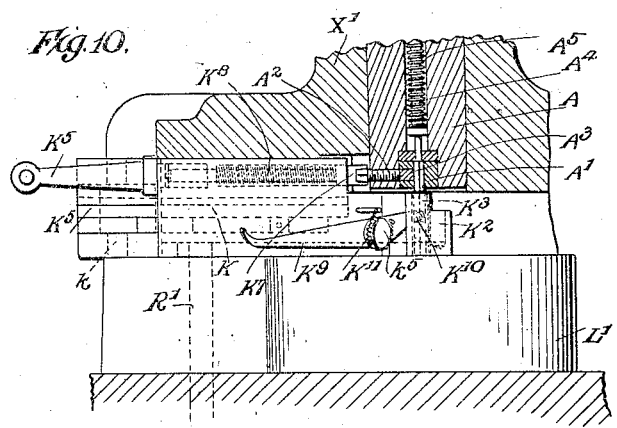

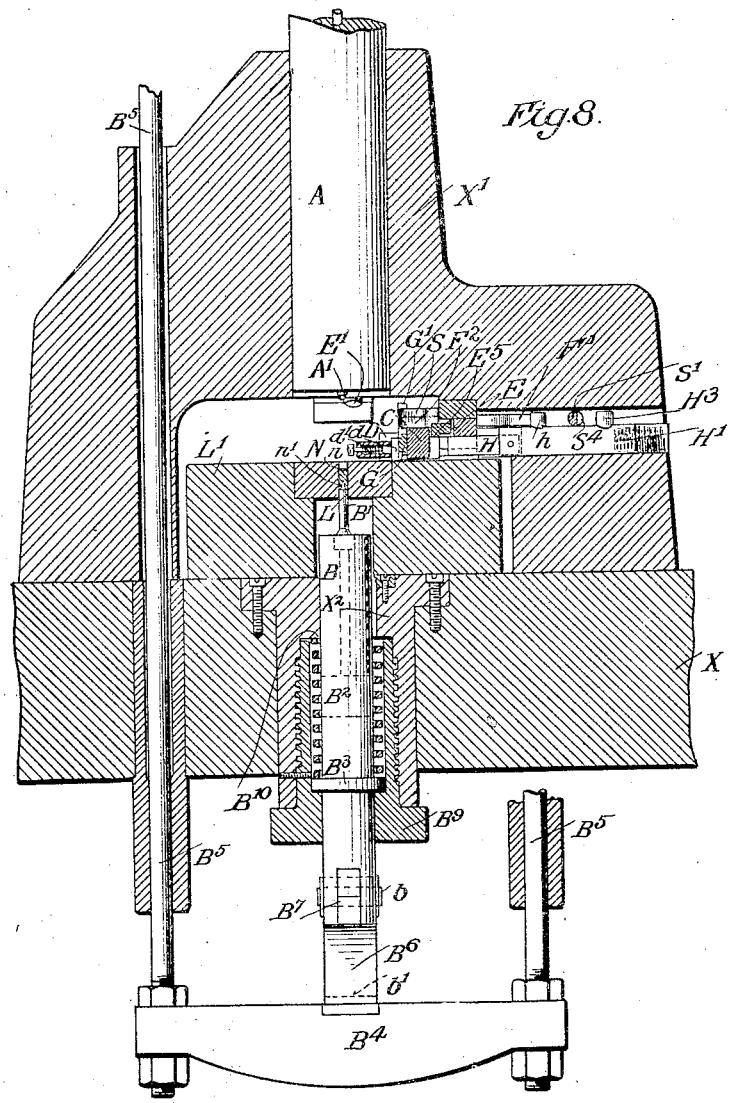

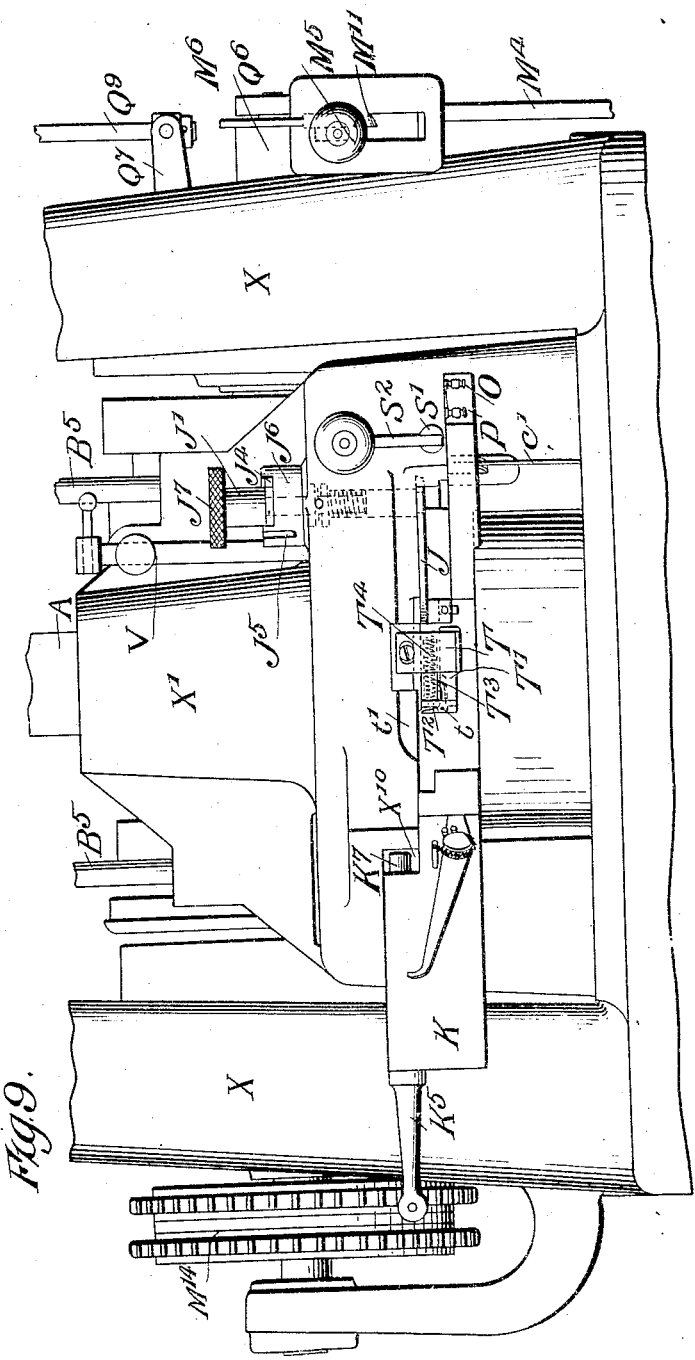

F. H. PIERPONT.
MATRIX STAMPING OR PUNCHING MACHINE.
APPLICATION FILED APR. 22, 1910.

1,042,475.

Patented Oct. 29, 1912.
15 SHEETS—SHEET 10.

F. H. PIERPONT.
MATRIX STAMPING OR PUNCHING MACHINE.
APPLICATION FILED APR. 22, 1910.

1,042,475.

Patented Oct. 29, 1912.
15 SHEETS—SHEET 14.

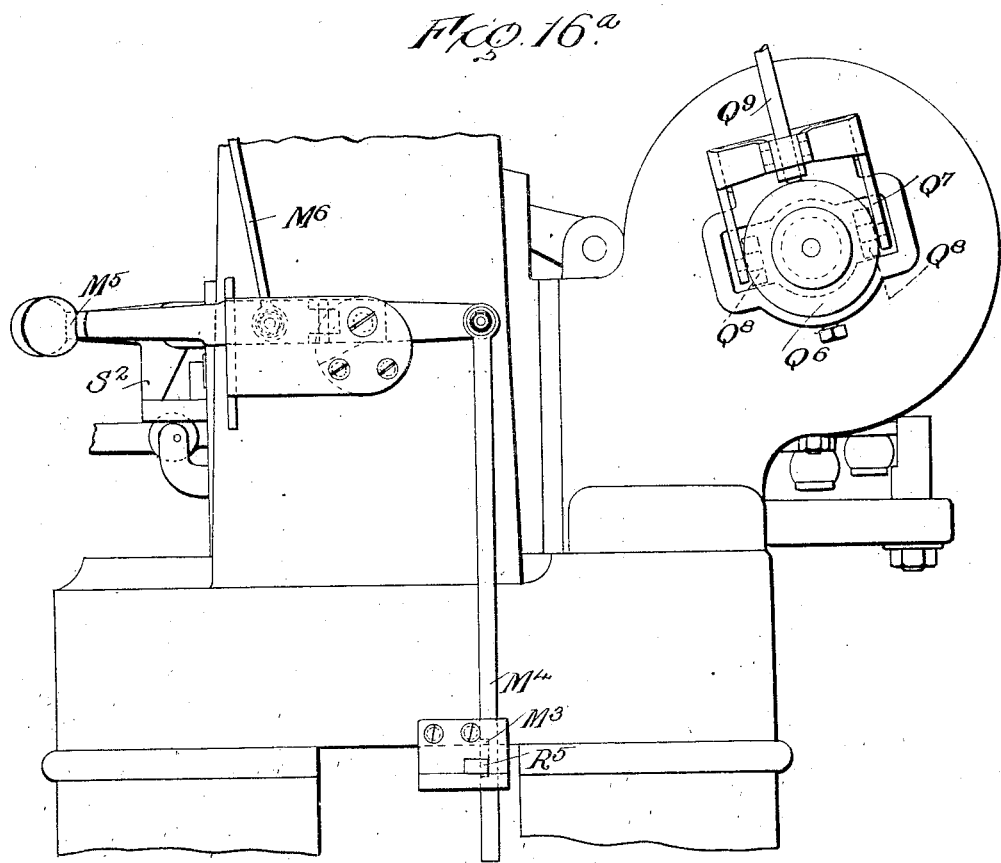

UNITED STATES PATENT OFFICE.

FRANK HINMAN PIERPONT, OF HORLEY, ENGLAND, ASSIGNOR TO LANSTON MONOTYPE MACHINE COMPANY, OF PHILADELPHIA, PENNSYLVANIA, A CORPORATION OF VIRGINIA.

MATRIX STAMPING OR PUNCHING MACHINE.

1,042,475.  Specification of Letters Patent.  Patented Oct. 29, 1912.

Application filed April 22, 1910. Serial No. 557,020.

*To all whom it may concern:*

Be it known that I, FRANK HINMAN PIERPONT, a citizen of the United States, domiciled at Horley, in the county of Surrey, England, have invented a certain new and useful Improvement in Matrix Stamping or Punching Machines; and I do hereby declare the following to be a full, clear, and exact description of the same, reference being had to the accompanying drawings, forming a part of this specification, and to the figures and letters of reference marked thereon.

This invention relates to punching or stamping machines and refers more particularly to the stamping or punching of characters, points or other symbols in or upon type matrices, such as are employed in type-casting or type-founding machines. In these machines, an example of which is to be found in Patent No. 687,779, dated Dec. 3, 1901, the drive is completed in a single blow of the punch on the matrix or blank, and not only is it necessary that extreme accuracy should be attained, but as the machines are generally operated by unskilled labor, it is desirable or essential that the parts of the machine requiring renewal are readily got at and adjusted, and that the various mechanisms brought into play during a cycle of operations should perform in proper sequence without necessitating close attention on the part of the operator or calling for the exercise of high mechanical skill or knowledge.

It is the chief object of the present invention, therefore, to provide a machine which is entirely self-acting or automatic, the blanks being fed forward, conveyed singly from a delivering holder or a galley to a movable transferrer or carrier to be transferred thereby to a die, punched, ejected from the die and then transferred by the carrier to a receiving galley or holder without requiring or calling for any action on the part of the attendant beyond the manipulation of a starting handle or lever at the beginning of the operation or cycle of operations. The blank during the stamping or punching operation is disposed in a die, the aperture in which is of dimensions only sufficient to receive the blank, and the ends of the die are closed during stamping by opposed plungers so that the blank is completely surrounded and supported against a bodily distortion or displacement. The opposed plungers, either or both of which may be adapted to carry a punch, are automatically operated, and the blank is automatically delivered to a carrier adapted to receive and automatically transfer blanks between the holder and the die, and a stamped matrix between the die and the receiving holder, pushers automatically operated being provided for delivering a stamped body or matrix from the carrier to a receiving galley, and a blank from the carrier to the die, and also for delivering a blank from a suitable holder to the carrier. The opposed reciprocating plungers are, according to the present invention, operated from a common cam or eccentric, to which one plunger, preferably that carrying the character or like punch, is connected by a cross head and connecting rod or other appropriate mechanism. The other plunger which may be provided with a punch or with a supporting or positioning projection or the like is carried by a crosshead conveniently connected by links or rods to the crosshead and the other punch and between the crosshead and the links is disposed a trip device which releases the plunger from its driving mechanism at a predetermined point in the stroke or travel allowing the plunger to return under spring pressure or gravity while the crosshead continues to follow the movement imparted by the driving mechanism. The movable carrier or transferrer which is a feature of the present invention, is adapted to oscillate between the die and the receiving and delivering galleys, and is provided with two seats or sockets. This carrier is moved from a position in which the seats are in line with their respective galleys, first to a position to receive a stamped matrix as it is delivered or ejected from the die; next to a position to deliver a blank to the die and is then returned to its original position when the stamped matrix is delivered or transferred to the receiving galley and an unstamped blank is ejected from the delivering galley into the proper seat in the carrier. After receiving the stamped matrix the carrier is automatically moved to bring an unstamped matrix carried therein over the aperture in the die, and mounted upon the carrier is a lever or pusher which, when the blank is over the aperture, is automatically operated or depressed to deliver the blank from the carrier to the die.

It is also an essential feature of the present invention to provide an automatic safety mechanism whereby an abnormal or damaged blank, a broken punch or any other foreign substance or body in the vicinity of the punching mechanism the die or the transfer mechanism will either be removed by the safety mechanism, or if the obstruction is a fixed one, a throw-out mechanism is brought into action to disconnect or open the driving clutch and thereby stop the machine and prevent damage to the parts or an entire breakdown. It is not left, therefore, to the operator to remove an obstruction or to stop the machine. This safety device comprises a feeler or wiper operated conveniently from a cam and prior to the movement of the carrier or before or after each stamping operation. This feeler is passed over the die and the surrounding plate or block to remove any obstruction, or if the obstruction is fixed by the interference with the normal travel of the feeler it brings a throwout or unclutching mechanism into operation to stop the machine. The wiper thereafter coöperates with the carrier to retain or hold the stamped matrix ejected from the die in its seat or socket in the carrier.

Another feature of the invention provides for the ready and easy inspection of a matrix or other body after stamping so that a defective punch may be detected at once. This comprises a movable holder which forms normally the mouth or entrance to the receiving galley and is capable of being withdrawn or turned into another position to bring the last stamped and ejected matrix under the observation of the attendant.

The invention further contemplates the provision of mechanism for quickly removing and inserting punches; likewise for preventing the operation of the machine during the time the punch-inserting and removing device is in operative position. The pushers associated with the carrier, the one to deliver a stamped matrix from the carrier to a galley, and the other to deliver or permit the delivery of a blank from a galley to the carrier, are conveniently operated from a common source of power. One of these pushers is mounted upon the carrier as is likewise a pusher for delivering a blank from the carrier to the die, this pusher, when the blank is over the aperture in the die, being in the path of movement of a reciprocating spring-controlled rod automatically operated from a cam.

The mechanism or tool by which the character or like punch is readily removed from, and a fresh one inserted in the reciprocating plunger, is movable into two positions, one to receive a punch from the plunger and the other to position a fresh punch in the plunger. Carried by this tool is a device for releasing a punch from or fixing one in the plunger. As this tool when in use would or might cause damage to the machine should the latter be operated, the movement of the tool into operative position automatically actuates a locking mechanism which prevents the starting handle of the machine from being operated. Should the operator however be so far forgetful as to manipulate or attempt to manipulate the tool during the running of the machine, then its presence will either interfere with the travel of the wiper above mentioned and thereby cause the operation of the throw-out mechanism, or the locking mechanism will prevent the operation or movement of the tool. The main shaft is driven from a motor through a clutch of the one-revolution type, and the cam shaft is driven from the main shaft through chain and sprocket or other appropriate gearing.

Figure 2:
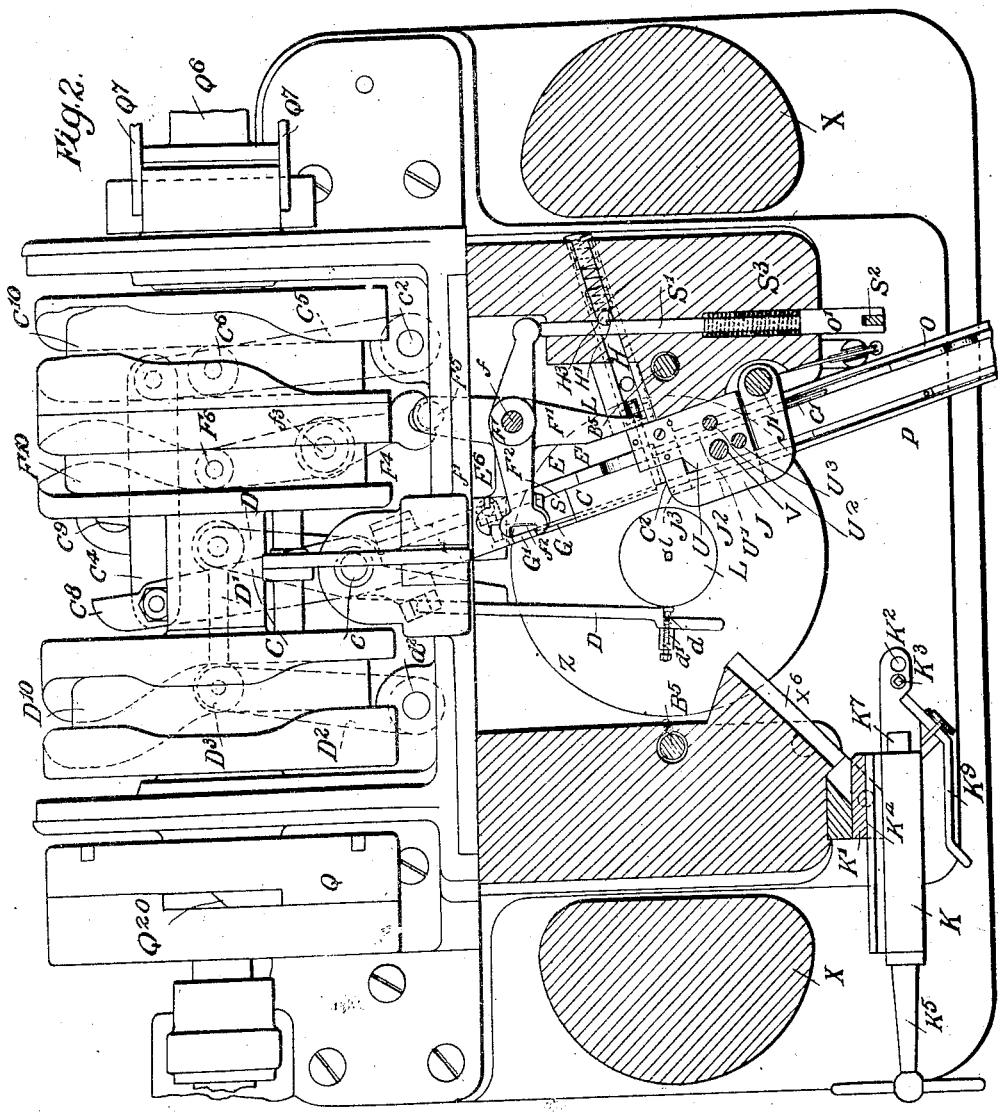
Figure 3:
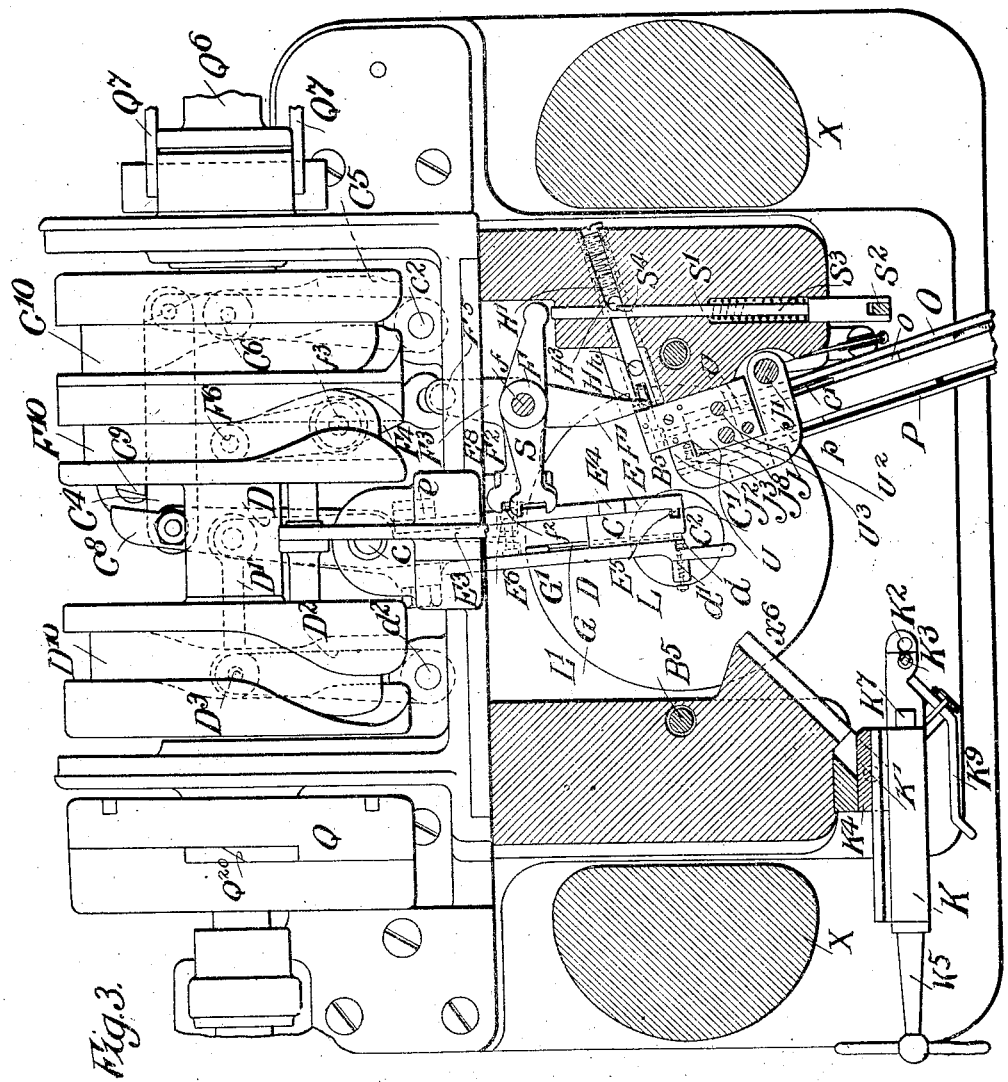
Figure 4:
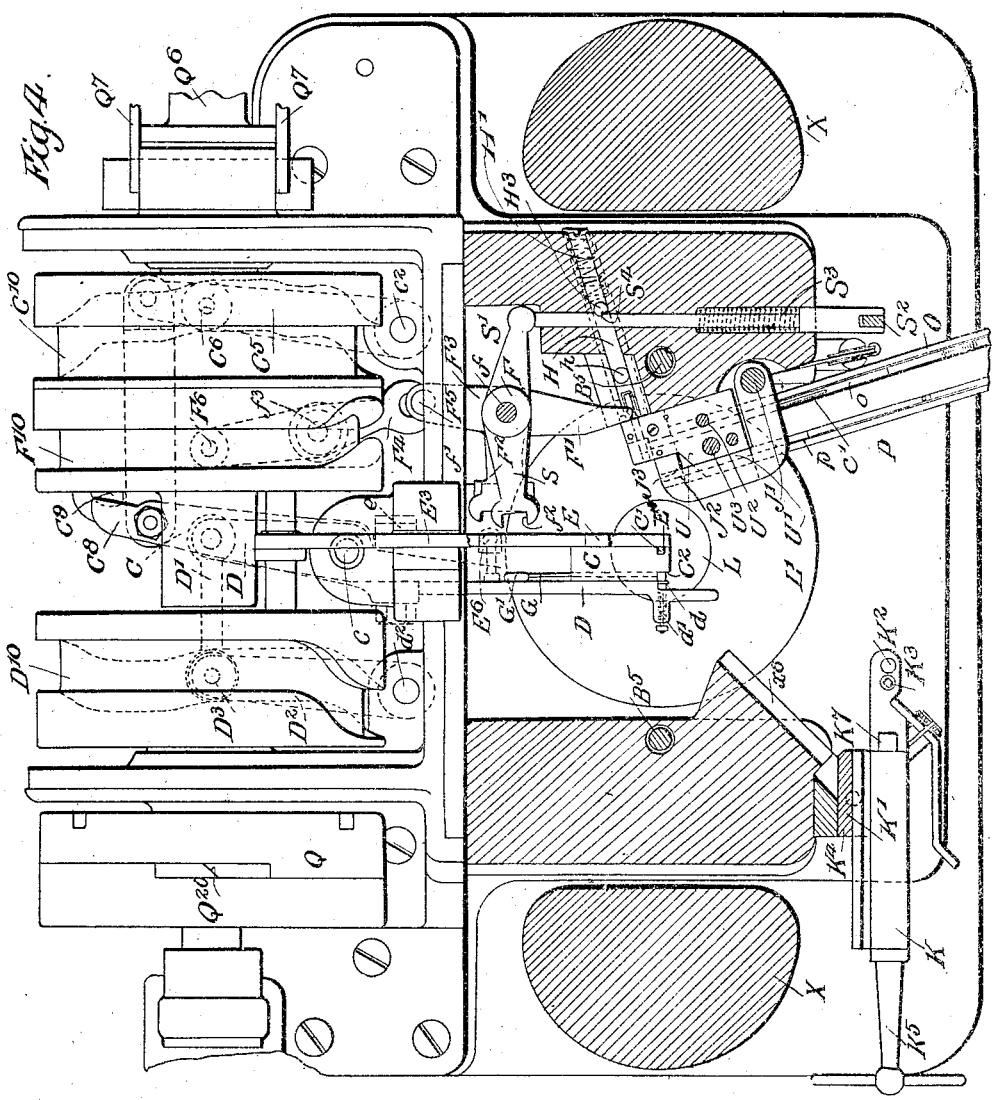
Figure 5:
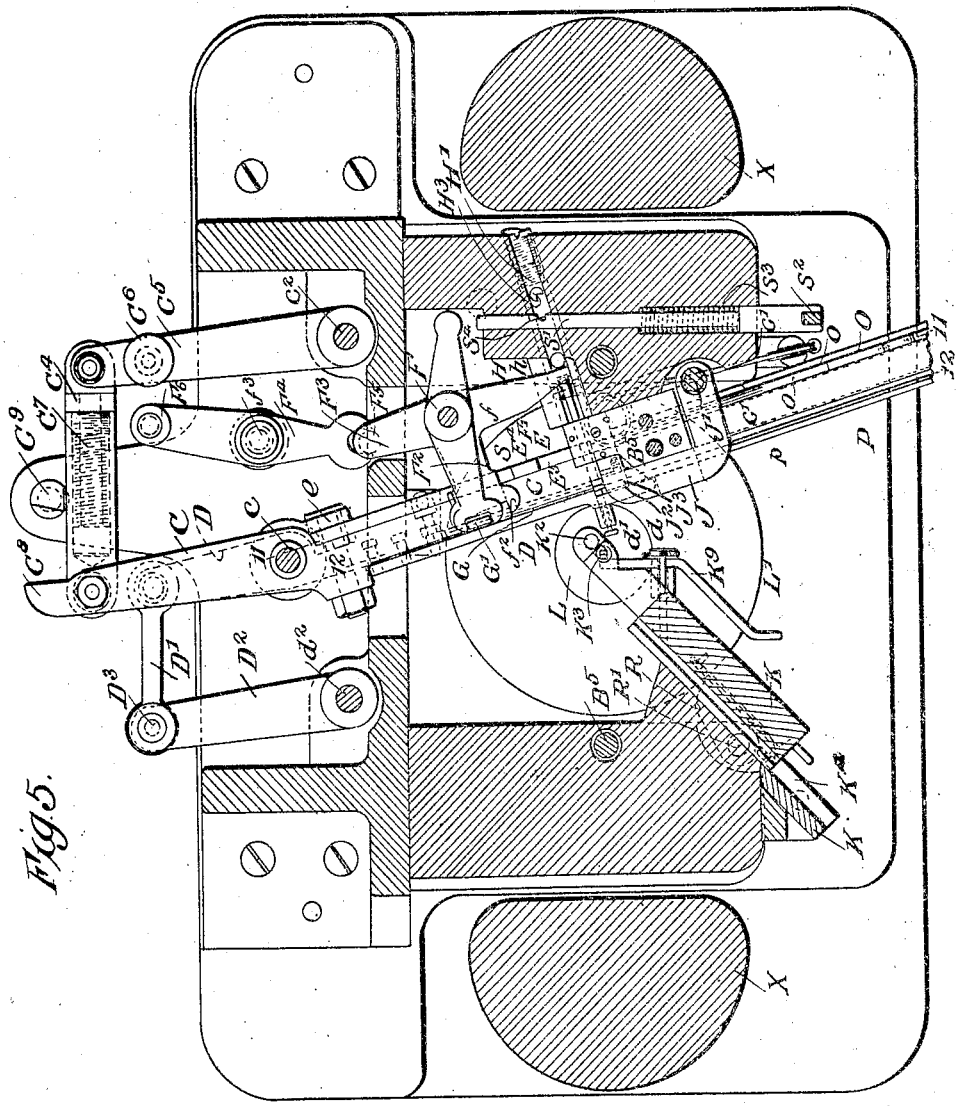
Figure 6:
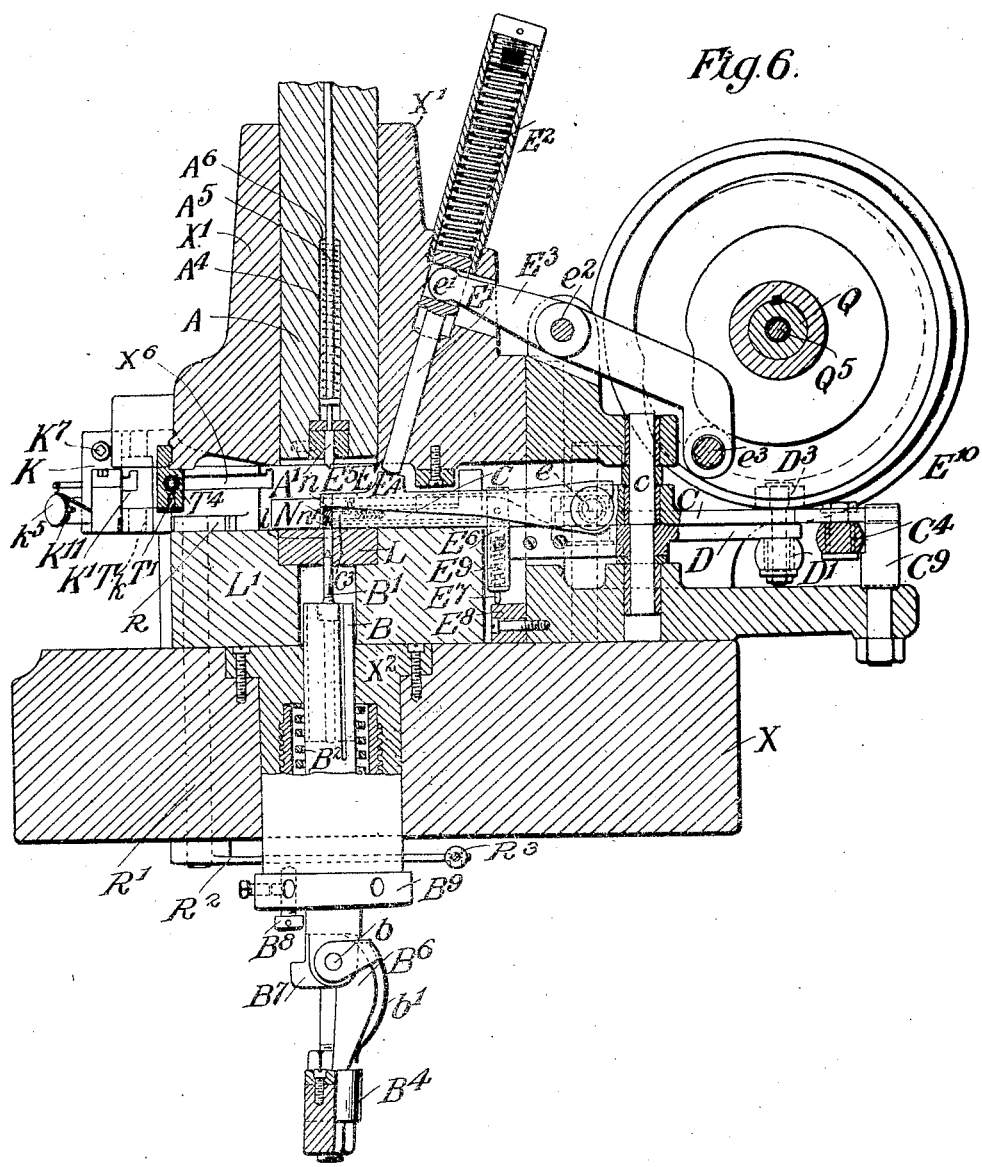
Figure 11:
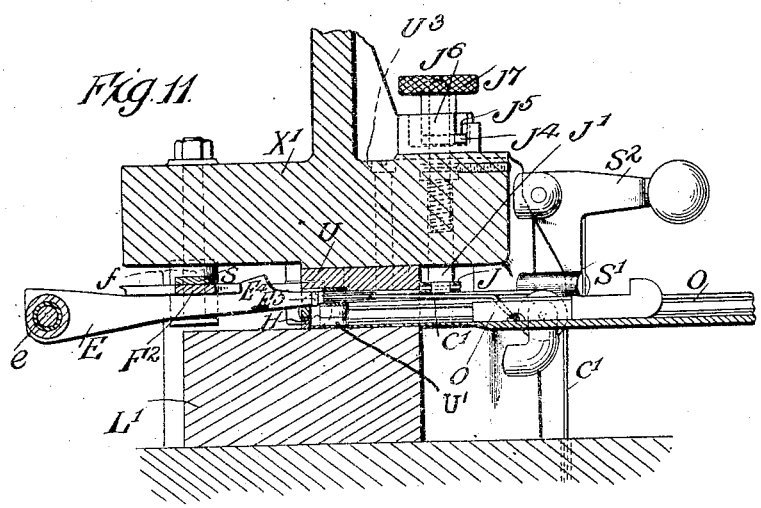
Figure 12:
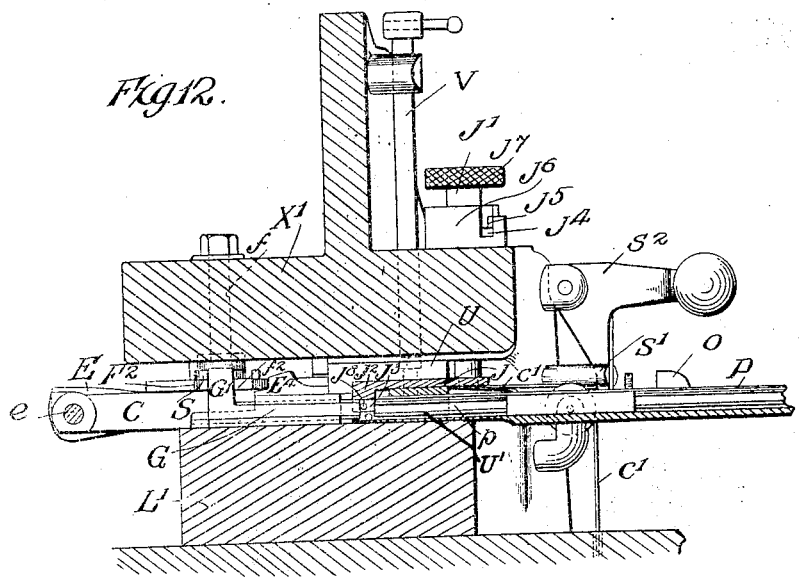
Figure 13:
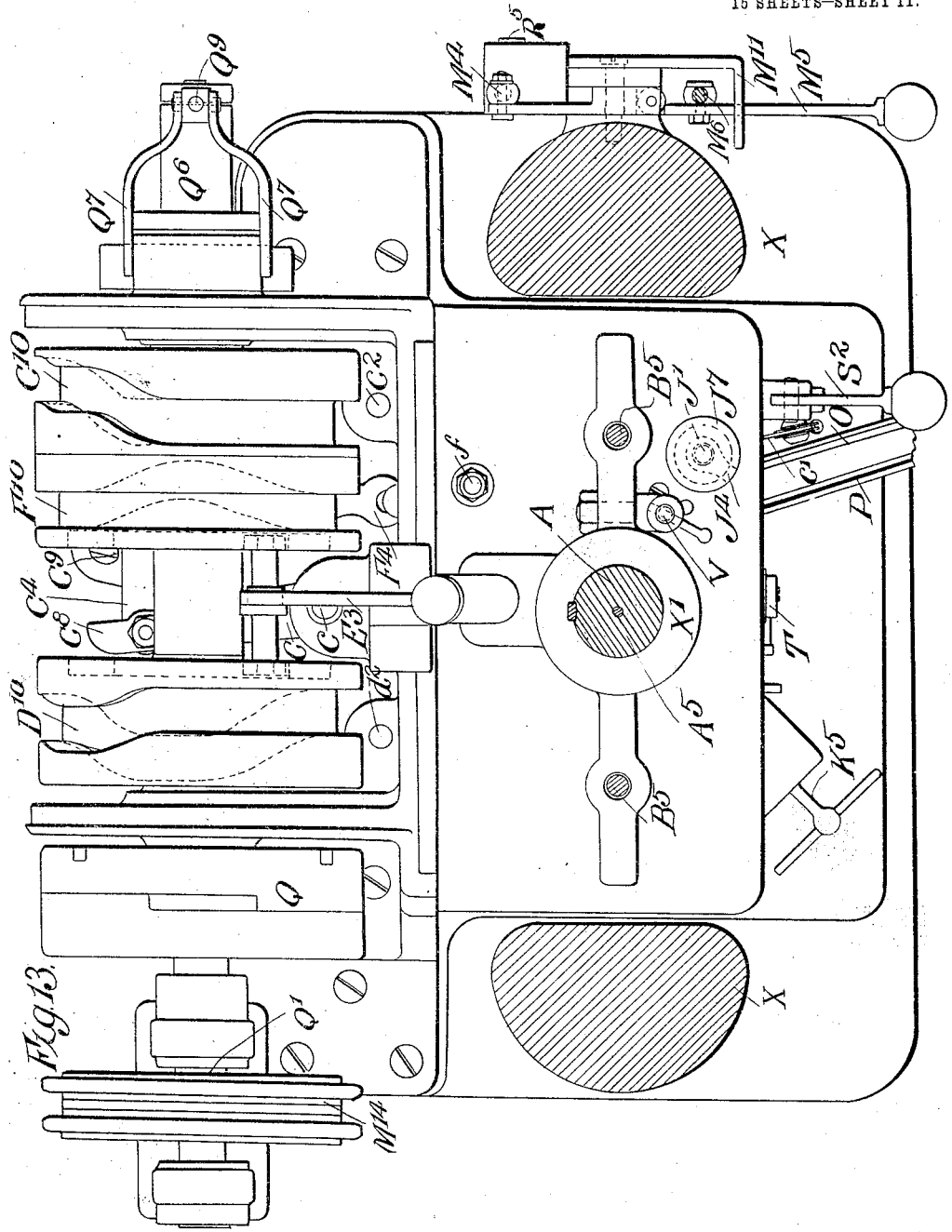
Figure 14:
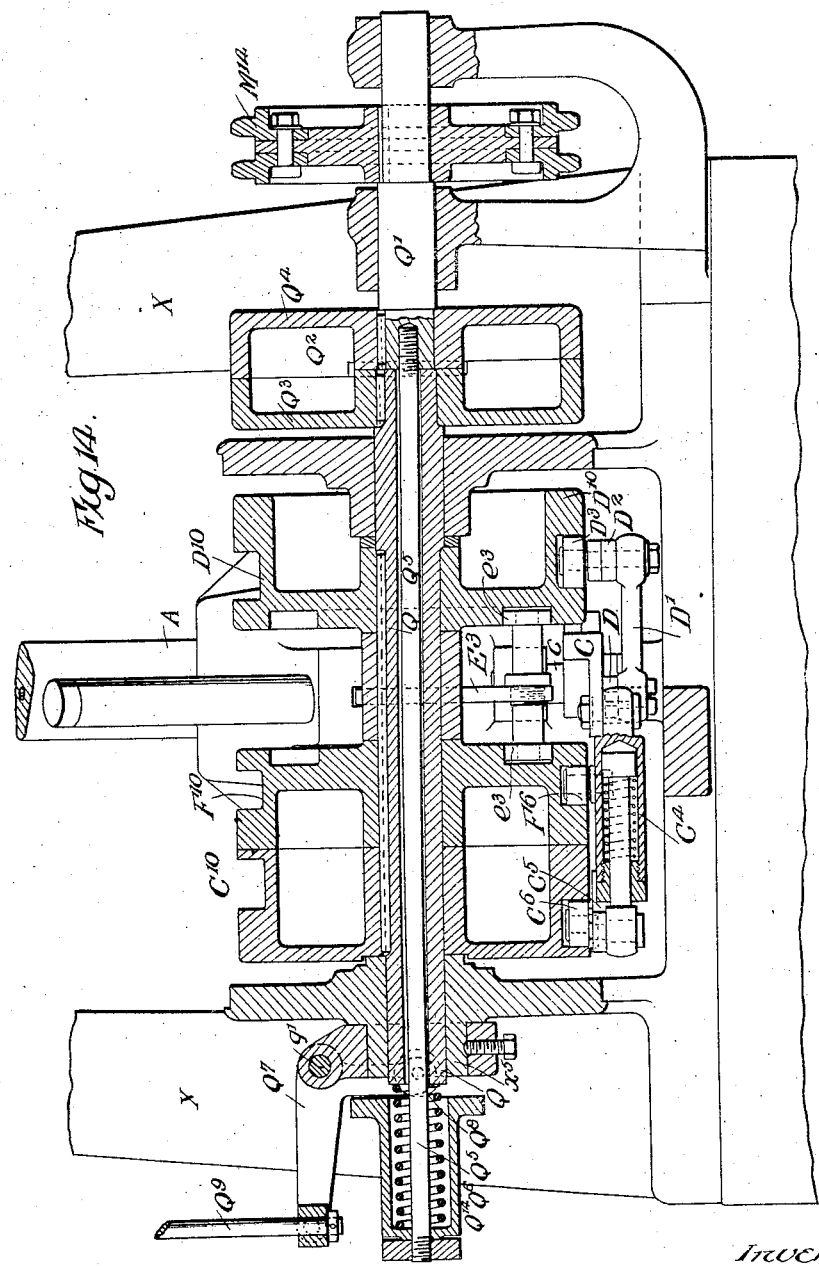
Figure 15:
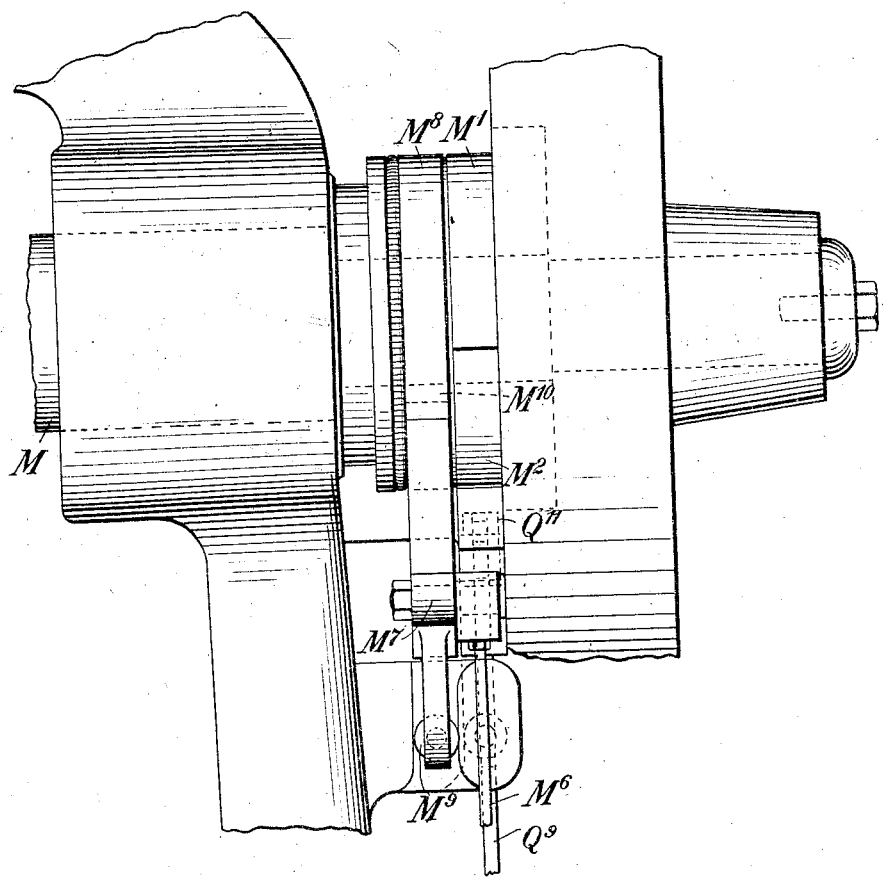
Figure 16:
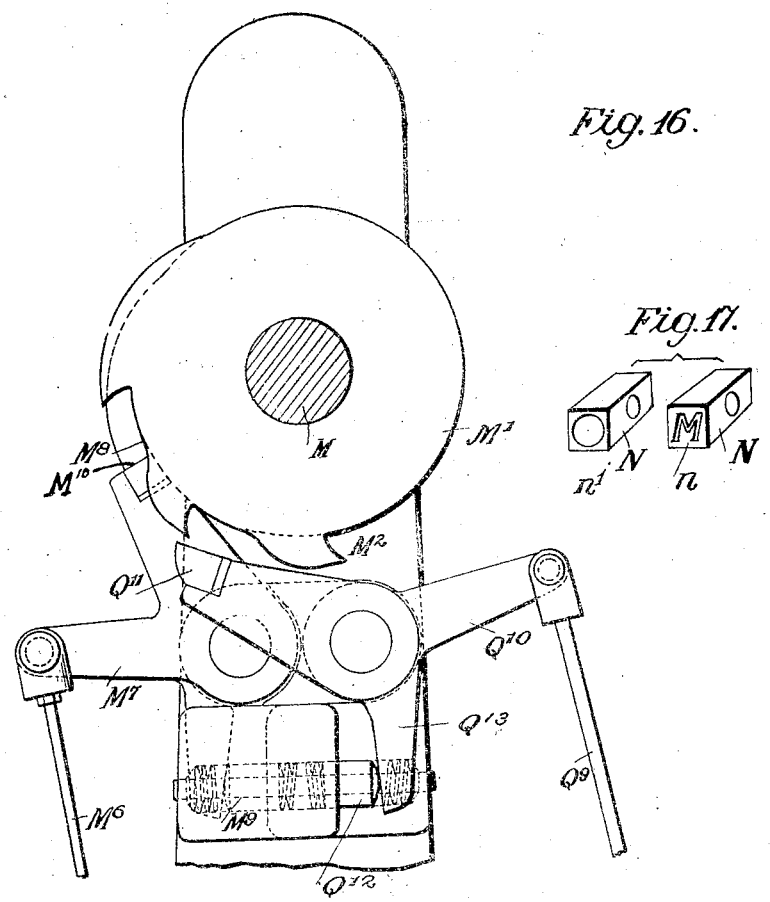
Figure 17:
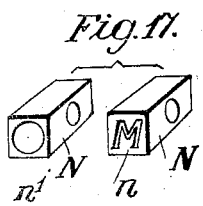

Referring to the drawings—Figure 1 is a front elevation of an embodiment of the invention as applied to a punching machine for producing characters, points or other symbols on type matrices such as are used in a well known form of type casting machines. Fig. 2 is a partial horizontal section on line 2—2, Fig. 1, the operating devices such as the cams, levers, tool etc. being shown in elevation. Fig. 3 is a similar view the operating members being shown in a different position. Fig. 4 is a similar view, the operating members being in still another position. Fig. 5 is a similar view with the cam shaft omitted and the punch transferring tool advanced beneath the plunger. Fig. 6 is a sectional elevation on the line 6—6, of Fig. 1, showing the blank transferrer or carrier and the mechanism for ejecting a blank from the carrier to the die together with some associated parts. Fig. 7 is a sectional plan on the line 7—7, of Fig. 1, showing the punching, inserting and removing device or tool. Fig. 8 is a sectional front elevation of the mechanism shown in Fig. 6. Fig. 9 is a front elevation of part of the mechanism shown in Fig. 6. Fig. 10 is a sectional elevation showing the punch inserting or removing tool in position to unfix or secure a punch in the punch-carrying plunger. Fig. 11 is a sectional elevation on the line 11—11 of Fig. 5. Fig. 12 is a similar section on the line 12—12 of Fig. 5. Fig. 13 is a sectional plan on the line 13—13 of Fig. 1 and to a larger scale. Fig. 14 is a sectional elevation showing part of the safety or throw-off mechanism or gear. Fig. 15 is a side elevation of the driving clutch mechanism. Fig. 16 is an end elevation of the clutch gear, and Fig. 16a is a side elevation of the starting lever and connections. Fig. 17 is a view of a particular type of matrix for dealing with which the machine is especially contrived.

The same letters of reference indicate identical parts throughout the drawings.

A is the upper plunger; B is the lower plunger; C is the blank and matrix carrier or transferrer; D is the feeler or wiper controlling the safety or throwout mechanism; E is the pusher or arm which transfers a blank from the carrier to the die; F is an arm controlling a blank pusher H and a matrix pusher G; J is the holder situated between the carrier and the receiving galley to allow for the inspection of a punched matrix; K is the punch-inserting and removing tool, and L is the die.

The upper plunger A which carries the character or symbol punch A' is supported in a longitudinal bearing X' of the machine frame X, and above the bearing X' it is attached to a crosshead $a$ mounted between guides $x$ on the frame X. The crosshead $a$ is attached by a longitudinally adjustable connecting rod $A^2$ to an eccentric on a driving shaft M (see Fig. 1) carried in appropriate bearings in the uprights or standards of the main frame.

The lower plunger B is mounted in a bearing $X^2$ (see Figs. 6 and 8) in the machine frame and between a shoulder $B^{10}$ on the frame and a shoulder or collar $B^3$ on the plunger there is inserted a spring $B^2$. The collar $B^3$ when the plunger B is in its lower position or the position it assumes during the stamping or punching operation rests upon the sleeve $B^9$ threaded into the lower end of bearing $X^2$ which takes the force of the drive.

The matrices N, Fig. 17, with which the machine according to the present embodiment of the invention is intended to deal are of parallelepiped form and on the end opposite to that receiving the impress of the character, are provided with a conical or tapering opening $n'$ for the reception of a centering plunger when in the type casting machine. The plunger B therefore carries a tapered rod B' or support conforming to this opening to prevent it closing or deforming under the force of the drive, but this rod B' may be replaced by a punch so that the conical opening may be punched in the matrix simultaneously with the character.

The plunger B is operated from a reciprocating crosshead $B^4$ connected at each of its ends by a rod $B^5$ to the crosshead $a$ carrying the plunger A.

The blank to be stamped is conveyed to a position over the aperture $l$ in the die L, by the carrier C and the die is received in a socket in a block or plate L', the die-opening $l$ conforming exactly to the outward shape of the blank N.

In the stamping position, the blank rests upon the supporting rod B', the plunger B being in the position shown in Figs. 6 and 8, the spring $B^2$ having forced the plunger B down so that the force of the drive through plunger B is received by the sleeve $B^9$ on which the plunger collar $B^3$ rests. The plunger A with the character punch A' is advanced to deliver a blow to the upper end of the blank, and when the crosshead $a$ returns or moves upward after the punching operation it carries the crosshead $B^4$ with it.

Between the lower end of the plunger B and the crosshead $B^4$ is a trip pawl $B^6$ (see Figs. 6 and 8) which is pivoted to the plunger at $b$ and is maintained in the path of the crosshead $B^4$ by a spring $b'$. In the upward movement of the crossheads $a$ and $B^4$ the crosshead $B^4$ ultimately contacts with the pawl $B^6$ and carries the plunger B and rod B' up also so as to raise the punched matrix N out of the die L. When the matrix is raised clear of the die, a shoulder $B^7$ on the pawl $B^6$ comes into contact with an adjustable stud $B^8$ on a sleeve $B^9$, or on the machine frame, thereby shifting the pawl $B^6$ out of contact with the crosshead $B^4$ permitting the cross head to continue its upward motion in company with the crosshead $a$ and punch A, and allowing the plunger B and rod B' to be forced downward by the spring $B^2$ thereby withdrawing the rod B' from the opening $n'$ in blank, and out of the path of the carrier C.

The sleeve $B^9$ in which the adjustable stub $B^8$ is mounted is screwed into the machine frame or into a sleeve carried thereby and is provided internally with an annular shoulder against which the collar $B^3$ on the plunger B rests so that the position of the plunger relatively to the die L and the tension or available power of the spring $B^2$ can be regulated by turning the sleeve $B^9$.

Blanks N are conveyed singly from a delivery galley O to a position immediately above the opening $l$ in the die L by the carrier or transferrer C which also transfers the stamped or punched matrices from the die L to a receiving galley P conveniently situated alongside and parallel with the delivery galley O. Between the galleys O and P and the carrier when the latter is in the receiving and delivering positions is placed a magazine U having ways or grooves U' corresponding to those in the galleys and constituting prolongations thereof. This magazine is secured in position by a dowel pin $U^2$ and a screw pin $U^3$ so that one way is in line with the delivering galley and the other way is in line with the receiving galley. The galleys themselves are formed integral with one another and are secured in position by a screw rod V.

The carrier or transferrer C comprises an arm or lever pivoted intermediate its ends as at $c$ to the machine frame and having at one of its ends a blank receiving opening or seat C' and a matrix receiving seat $C^2$ (see Figs. 3 and 4). A cam $C^{10}$ on a cam shaft Q controls the arm C which normally is in the position indicated at Figs. 2 and 5 with the seats C' $C^2$ in line respectively with the ways in the magazine U communicating with the delivering and receiving galleys O and P.

The outlet or delivery end of the way U' in the magazine communicating with the delivery galley O is normally closed by the reciprocating pusher H which is mounted in a recess or opening in the machine body and maintained in position to close the outlet or way by a spring H' disposed between the inner end of the pusher H and the end of the recess. The pusher H is moved endwise against the action of its controlling spring H' by an arm F' of the bell crank lever F which is pivoted on the machine frame at $f$. The arm F' engages with a projection $h$ on the pusher H. Another arm $F^2$ of the lever F, when the carrier is in the receiving and delivering position, is adapted to engage and operate the matrix delivery pusher G carried in suitable guides or bearings on the carrier C for which purpose the arm $F^2$ is forked at $f^2$ at its outer end to embrace a stud or projection G' on the pusher G when the carrier is in the blank receiving and matrix delivering position (see Figs. 2 and 5).

When the carrier C is moved by its cam $C^{10}$ into the receiving and delivering position, the cam $C^{10}$ is so formed as now to provide for a dwell or rest in the movement of the carrier C during which the lever F is turned upon its fulcrum, causing arm $F^2$ to actuate pusher G to eject the matrix N from the seat $C^2$ and the arm F' to engage and actuate the pusher H so that a blank is delivered from the galley O into the seat C' in the carrier C. The blanks in the galley O are constantly pressed toward the galley outlet and along the way in the magazine by a follower $o$ to which is connected a cord $o'$ running over one or more pulleys and having a weight attached to it in a well known manner. Another arm $F^3$ of the lever F carries a roller $F^5$ which is embraced by the forked end of a lever $F^4$ pivoted at $f^3$ intermediate its ends and having at its other end a roller $F^6$ engaging the cam $F^{10}$.

The blank N delivered into the seat C' in the carrier C is retained there by a spring-controlled pin $C^3$, Fig. 6. The matrix N in the seat $C^2$ of the carrier C is held in proper position by a plate $d$ controlled by a spring $d'$ and conveniently this spring and plate are carried by the wiper D. The wiper D conveniently comprises an arm fulcrumed on the pivot $c$, Fig. 6, on which the carrier is pivoted, and is connected at its rear end by a link D' with a link $D^2$ pivoted at $d^2$ to the machine frame. At the point of connection of the links D' $D^2$ is a roller $D^3$ which engages a cam $D^{10}$ and during the time the carrier C is in the receiving and delivering position the cam $D^{10}$ moves the wiper over the surface of the plate L' and die L so that the wiper may remove any movable obstruction from the path of the carrier C or punch A. Should the obstruction be a fixed one then it will interfere with the travel of the wiper D and prevent it from performing its full excursion and through mechanism hereinafter described the wiper D under such circumstances effects the stoppage of the entire machine preventing damage to the parts thereof.

Provided that no fixed obstruction has been encountered, the wiper D returns under the action of its cam $D^{10}$ until it contacts with one side of the carrier C which has now been advanced by the cam $C^{10}$ to assume a position with the seat $C^2$ over the opening $C$ in the die L (see Fig. 3). This advance of the carrier C takes place during the upward movement of the crossheads $a$ and $B^4$ and so that when the carrier is advanced with the seat $C^2$ over the die, the plunger B has pushed the stamped or finished matrix N out of the die L and the wiper D returning as stated, the matrix is placed in the seat by the spring-controlled plate $d$.

The matrix N having been gripped between the carrier C and the wiper D these two members are now advanced in company by their respective cams to bring the seat C' in the carrier C over the opening $l$ in the die L in which position the motion of the carrier C is again stopped. During the time the seat C' is over the die opening, the pusher E is advanced, i. e., is caused to descend to push the matrix out of the seat C' into the die (see Fig. 4).

The rear end of the carrier C is connected to one end of an extensible link $C^4$ the other end of which is pivoted to a lever $C^5$ fulcrumed on the frame of the machine at $c^2$ and carrying a roller $C^6$ which engages the cam $C^{10}$. The link $C^4$ is extensible or telescopic being formed of two parts connected through a spring $C^7$ and on the end of the carrier C is a projection $C^8$ adapted to engage a stop $C^9$ which accurately determines the position of the carrier C to place the seat C' over the opening $l$ in the die L while the spring $C^7$ allows the roller $C^6$ to follow the contour of the cam $C^{10}$.

The pusher E is fulcrumed at $e$ to the carrier C so that it accompanies the carrier throughout its motion. It is depressed atively to the carrier C by a rod E′ (see Fig. 8) which is mounted in a socket in the frame between the inner end of which socket and the inner end of the rod is disposed a spring E². In the rod is formed a seat e′ for the reception of a lever E³ pivoted to the frame at e² and engaging by a roller e³ on its other end a cam E¹⁰ to depress the lever E. The lower end of the rod E′ bears on a projection E⁴ on the lever E when depressed and the cam E¹⁰ operates to depress the rod E′ when the carrier and with it the lever E moves into the position with the seat C′ over the opening in the die L (see Fig. 4). The lever E is provided with a projection E⁵ which extends over the seat C′ to engage the end of the blank therein (see Figs. 3, 4 and 11). Normally, the lever E is maintained in its upper position with the projection E⁵ out of the way of the entrance of the blank N by a pin E⁶ carried in a socket E⁷ on the carrier C and adapted to rest on a block E⁸ on the bed of the machine. The block terminates short of the ejecting position of the carrier leaving the lever E and pin E⁶ free to be depressed against the resistance of spring E². After the lever E has been depressed to place the blank in the die L and the rod E′ withdrawn by the cam E¹⁰, the carrier C is returned to the position in line with the galleys by the cam C¹⁰ when the punched matrix is delivered from the seat C² by the pusher G into the holder J to be pushed later by the subsequently delivered matrices into the magazine U and finally into the galley P. A fresh blank is now also delivered to the seat C′ by the pusher H, the punch A being lowered now to stamp the blank that has been placed in the die.

Should the travel or excursion of the wiper D be interfered with by a fixed obstruction the machine is stopped so that no damage takes place to the parts through the presence of the obstruction. The wiper D by its rear end engages with or is operated by a cam D¹⁰ as already described. This cam is fixed to a hollow shaft or sleeve Q, Fig. 14, extending along the back of the machine and having mounted upon it also the cams C¹⁰ and F¹⁰. The shaft Q is driven from a shaft Q′ through a one-way acting clutch Q² one member Q³ of which is fast on the shaft Q and the other member Q⁴ is fast on the driving shaft Q′. Screwed into or otherwise secured to the clutch member Q⁴ is a rod Q⁵ which is carried through the bore of the shaft Q and has on its outer end a cap or shoulder Q⁶. Contiguous to this cap Q⁶ is a bell crank lever Q⁷ pivoted at q′ to the bearing x⁵ of the shaft Q in the standard of the machine. The lower end of this bell crank lever is forked and provided with rollers Q⁸ or other suitable bearing surfaces and the other end of the lever Q⁷ is connected to a rod Q⁹ the upper end of which is pin-jointed to one end of a lever Q¹⁰ (see Fig. 16) fulcrumed on the machine frame and provided on its other end with a pawl Q¹¹ adapted to engage an operating member M² of the main clutch M′ on the driving shaft M. Normally the lever Q¹⁰ is held out of engaging position by a spring-controlled pin Q¹² which acts upon a projection Q¹³ on the lever Q¹⁰.

The wiper D if prevented from performing its normal travel or excursion bears heavily on its cam D¹⁰ thereby tending to prevent the cam turning and the drive of the shaft Q′ remaining normal, the clutch Q² is opened through inclines Q²⁰, Figs. 2 and 3, and the part Q⁴ thereof in overrunning the part Q³ is forced to the right pulling the rod Q⁵, and through the lever Q⁷ and the rod Q⁹ interposing the pawl Q¹¹ in the path of the main clutch actuating member.

The parts Q⁴ Q³ of the clutch Q² are normally held in position for driving by a spring Q¹⁴ interposed between the end of the cam shaft Q and the cap Q⁶ on the rod Q⁵ and which while strong enough to resist the tendency of the clutch members to overrun during normal driving is not strong enough to prevent the opening of the clutch with the extra load produced by the interruption of the travel of the wiper D.

The shaft Q′ is driven from the main shaft M by double chain and sprocket gears M¹² M¹³ M¹⁴.

It is necessary or desirous that the attendant be able to inspect the matrices from time to time so that a broken or defective punch may be detected; in the machine according to this invention this is provided for by the holder J. This block or member J is mounted upon an upright shaft J′ carried in the machine frame and has a projecting part or nose J² located between the seat C² in the carrier C and the way in the magazine U leading to the entrance to the receiving galley P.

In the part J² is formed a slot J³ constituting a continuation of the matrix slot p in the galley P, and it is into this slot J³ that the pusher G transfers the matrix from the seat C² in the arm C (see Fig. 5) wherein it is retained by a spring-controlled pin J⁸.

The shaft J′ is locked against rotation to maintain the member J in proper position by a projection J⁴ which engages the wall of a slot J⁵ in a boss J⁶. This block J can be swung outward with the matrix last delivered from the carrier C by turning the shaft J′ for which purpose a knurled head J⁷ is provided on the shaft. Before turning, the shaft is first raised to bring the catch J⁴ clear of the slot J⁵ and lift the carrier clear of the galley.

To facilitate the insertion and removal of the matrix in the slot J³ in the block J there is mounted in front of the machine contiguous to the position assumed by the block J when swung outward a holder T (see Fig. 9.) This holder comprises a block having a pusher T' to which is pivoted at t the push lever T² provided with a catch T³. When the lever T² is actuated by a push applied below the pivot t, the pusher T' is advanced only sufficient to position the matrix properly in the opening in the holder J when the latter is swung outward as the catch T³ engages a shoulder in the block T. When a push is applied to the lever T² above the pivot t the catch is moved clear of the shoulder and the pusher can be advanced far enough to eject a matrix from the holder J; a spring T⁴ returns the lever to proper position.

The galleys O and P when emptied and filled respectively can be removed and replaced by others. When all the matrices required have been stamped there will be some in the slot in the block J and in the receiving way in the magazine leading to the entrance of the galley P, which will not be pushed into the galley by the pusher G acting under the influence of the cam F¹⁰ and to facilitate the removal of these matrices by having them transferred to the galley P there is provided an arm S fulcrumed on the pivot f with one end forked to engage the projection G' on the pusher G and the other end disposed in the path of a longitudinally movable rod S'. The rod S' is furnished with a crank lever S² pivoted to the machine frame and by operating this lever the rod S is moved inward against the action of a spring S³ to move the lever S and thereby move the pusher G to a greater extent than it can be moved by the cam F¹⁰ and lever F F'; to permit of this movement the fork f² of the lever F which embraces the pusher head G' is elongated.

The rod S' is notched at S⁴, Figs. 2, 3 and 4, and with this notch engages a stop H³ on the pusher H when the latter is at the forward extremity of its travel so as to prevent the rod S' being operated except when the carrier C is in line with the galleys in which position the pusher H is retracted (see Figs. 2 and 5).

The punch A' is removed from and inserted in the socket in the plunger A by the tool K, Figs. 2, 3, 4, 5, 7, and 10, mounted on a pivoted bearing block K' and adapted to be moved along a slide or guide x⁶ in the frame with its lower surface on a level with the upper surface of the block in which the die L is inserted.

In the forward end of the tool K are two openings or sockets K² K³ both adapted to receive a punch A'. After having a punch placed in the socket K³ the tool and its bearing K' are turned on the pivot k from the position shown in Fig. 2 until the guide K⁴ in the block K' is in line with the guide x⁶ on the frame when the tool K' can be moved into the position shown in Fig. 5. In this position the socket K² is under the plunger A to receive the punch released from the plunger. The punch is held in the plunger by a locking bolt A² bearing against a wedge-piece A³ let into the punch socket a (see Fig. 10.)

In the tool K is mounted a handle K⁵, Figs. 7 and 10, connected to a rod K⁶ having on its farther end a box spanner K⁷ which is adapted to engage the head of the locking bolt A² (see Fig. 7.) The handle K⁵ is connected to the rod K⁶ so that the latter may be turned by the handle by pins k' which enter slots k² in the rod, and the slots are elongated so that the rod can move longitudinally relatively to the handle K⁵ under the influence of a spring K⁸ disposed in a hollow part of the block K between a shoulder k³ on the rod K⁶ and a shoulder k⁴ on the block K.

The spring serves to project the spanner so that it may engage the head of the bolt either when the tool is in position to place socket K³ or socket K² beneath the punch plunger A.

When the tool K has been pushed under the plunger A until the socket K² is under that plunger, the handle K⁵ is then advanced and turned to unscrew the locking bolt A², when the punch will be ejected from the plunger by the spring A⁴, Fig. 10, which bears on a rod A⁵ situated in a recess in the plunger above the punch and bearing by its upper end on a shoulder or offset A⁶ in the plunger. The punch having dropped into the socket K² the tool K is advanced until the socket K³ in which the new punch is situated is brought under the plunger A.

The socket K³ of the holder having been brought beneath the plunger the punch in the socket is raised by a lever K⁹ fulcrumed at k⁵ on the block K and having a projection K¹⁰ extending into the socket K³. The punch is raised by the attendant depressing the outer end of the lever K⁹ and then can be secured by the turning of the handle K⁵ and with it the spanner K⁷ while the lever K⁹ is depressed. The lever K⁹ on being released is returned to its normal position by a spring K¹¹.

To prevent the possibility of the machine being started with the tool K in a position to interfere with the operation of the plunger A or carrier C the tool K when in operative position actuates a lockout device. This device comprises a pivoted lever or trigger R mounted upon the upper end of a vertical shaft R' and standing normally in the path of movement of the tool K (see Figs. 5 and 7). To the other end of the shaft is secured an arm R² (see Fig. 6) connected to a longitudinally movable rod R³ (see Figs. 6 and 7) controlled by a spring R⁴ and attached at its outer end at r to a sliding bolt R⁵ adapted when moved to locking position to engage a notch M³ in a rod M⁴ (see Figs. 7 and 16ᵃ) which is connected to the handle M⁵ controlling through a rod M⁶ and lever M⁷ the operating member M⁸ of the main driving clutch M′ (see Fig. 16).

The tool K when moved to effect the insertion or removal of a punch forces the catch R aside and causes the bolt R⁵ to lock the rod M⁴ and operating handle M⁵ against movement. On the other hand, when starting handle has been moved into starting position it will prevent the tool K from being inserted as it will prevent the movement by the tool, of the locking mechanism.

The lever M⁷ controlled by the starting handle M⁵ normally stands under the influence of a spring-actuated bolt M⁹ (see Fig. 16) in position to engage a shoulder M¹⁰ on the clutch actuating member M⁸. To start the machine the handle is pulled down to disengage the lever M⁷ from the member M⁸, and if released the member M⁷ is returned by the spring M⁹ to engage again the member M⁸ and open the clutch M′ which is of the one-revolution type, after a single revolution of the driving shaft. When, however, a number of matrices of one sort are to be stamped, the handle M⁵ after being pulled down is moved into a catch M¹¹ (see Fig. 9) to retain the lever out of the path of the clutch member M⁸.

Having now particularly described and ascertained the nature of the said invention, and in what manner the same is to be performed, I declare that what I claim as new is:—

1. In a punching or stamping machine for type matrices or like bodies the combination with opposed reciprocating plungers or punches and an automatically operated carrier adapted to receive and transfer blanks and stamped bodies between holders or galleys and a die, of automatically actuated pushers on the carrier for delivering a stamped body from the carrier to a receiving galley and a blank from the carrier to the die and an automatically actuated pusher for delivering a blank to the carrier.

2. In a punching or stamping machine for type matrices or like bodies the combination with opposed reciprocating punches or plungers, of a carrier having separate seats for a blank and a finished matrix and automatically operated pushers mounted on the carrier to eject a blank from the carrier to the die and from the carrier to the receiving galley.

3. In a punching or stamping machine for type matrices or like bodies the combination with an oscillating carrier, of a wiper movable with the carrier to hold the matrix therein and relative to the carrier to detect or remove an obstruction; or to operate a stopping or clutch-opening mechanism.

4. In a punching or stamping machine for type matrices or like bodies, the combination with an oscillating carrier and parallelly disposed delivering and receiving galleys, of an automatically operated pusher for delivering or controlling the delivery of a blank from the delivering galley to the carrier and an automatically operated pusher on the carrier for controlling the delivery of a punched matrix from the carrier to a receiving galley.

5. In a punching or stamping machine for type matrices or like bodies, having an oscillating carrier, the combination with pushers E G and H of an automatically operated spring-controlled rod for engaging the pusher E, and a lever for operating the pushers G and H substantially as described.

6. In a punching or stamping machine for type matrices or like bodies, the combination with a pusher, of a pivoted operating lever and a catch controlled by the lever to determine the extent of the travel of the pusher.

7. In a punching or stamping machine for type matrices or like bodies, the combination with a punch carrying plunger, of a punch removing and inserting tool and a lockout mechanism controlled by the movement or position of the tool for the purpose described.

8. In a punching or stamping machine for type matrices or like bodies, the combination with a punch-carrying plunger, of a punch removing and inserting tool or instrument mounted in a laterally movable carrier and capable of sliding in ways in the carrier and in the machine frame, for the purpose described.

9. In a punching or stamping machine for type matrices or like bodies, the combination with a punch-inserting and removing tool having a punch-receiving socket and a delivering socket, of means for raising a punch out of the second socket and means for engaging the fixing screw for the punch.

10. In a punching or stamping machine for type matrices or like bodies, the combination with a punch-removing and inserting tool or instrument, of a locking device controlled by movements of the tool and including blocking piece adapted to engage and lock the starting handle of the machine, substantially as described.

11. In a punching or stamping machine, the combination of the following elements, to wit: a movable carrier provided with an ejector; a pusher delivering blanks to the carrier; automatic actuating devices for said carrier, ejector and pusher; manually operated means for projecting the carrier ejector; and an automatically positioned stop for locking the manually operated means during predetermined intervals.

12. In a machine for punching or stamping type matrices or like bodies, the combination with pushers H and G and a pusher actuating lever F F' F², of an actuating lever S and a rod S' for the pusher G and a stop on the pusher H adapted to engage the rod S' for the purpose described.

13. In a punching or stamping machine provided with a plunger and die, and actuating mechanism including a clutch, and in combination therewith, an automatic blank feeding mechanism including the following elements, to wit: a reciprocatory carrier coupled with and deriving motion from the actuating mechanism; a feeler connected with and controlling the clutch of said actuating mechanism; and actuating devices for causing said feeler to traverse across the die preliminary to the advance of the carrier.

14. The combination with a punching or stamping machine provided with a reciprocatory plunger, a complemental die and actuating mechanism for the plunger including a controlling clutch, of an automatic blank feeding mechanism including the following elements, to wit: a reciprocatory carrier coupled with and deriving motion from the plunger actuating mechanism; a feeler movable independently of said carrier and coöperating with the latter to retain a contained blank; connections between the plunger actuating mechanism and feeler for reciprocating the latter; and connections between said feeler and the controlling clutch for opening the latter when the feeler is arrested during its motion toward the carrier.

15. In a punching or stamping machine, the combination of the following elements, to wit: a reciprocatory plunger; a complemental die; a plunger actuating mechanism including clutching means; a reciprocatory blank carrier movable between the plunger and die and connected with and deriving motion from the plunger actuating mechanism; a feeler movable transversely of the plunger across the die; feeler actuating devices coupled with and deriving motion from the plunger actuating mechanism; and controlling means intermediate the feeler and said clutching means, for opening the latter.

16. In a punching or stamping machine, the combination of the following elements, to wit: a reciprocatory plunger and opposed die; a reciprocatory blank carrier provided with a seat; a feeler movable between the plunger and die and coöperating with the carrier to retain a blank in the seat therein; an actuating mechanism for said plunger, carrier and feeler including a driving clutch; and means controlled by the feeler and controlling said clutch for opening the latter when the feeler is arrested during its passage between the die and plunger toward the carrier.

17. In a punching or stamping machine, the combination of the following elements, to wit: a reciprocatory plunger and opposed die; a plurality of galleys; a carrier provided with a plurality of blank holders whereof the clamping member of one holder is movable independently of the carrier and arranged to traverse between the plunger and die toward the carrier; and actuating mechanism for said plunger, carrier and feeler, the same including a driving clutch, and means intermediate the latter and the feeler for opening the clutch when the feeler encounters and is arrested by an obstruction in its path toward the carrier.

18. In a punching or stamping machine, the combination of the following elements, to wit: a reciprocatory plunger and opposed die; two galleys located to one side the path of the plunger; a blank carrier movable between said galleys and the die and provided with two blank holders adapted for simultaneous registry with the discharge end of one galley and the receiving end of the associated galley; means for transporting a blank from the supply galley to one blank holder and from the associated holder to the other galley; a feeler normally located to one side of the die and movable across the latter toward the carrier when said carrier is in register with the galleys; and actuating mechanism for said plunger, carrier and feeler including a driving clutch, and means controlled by the feeler during its motion toward the carrier for opening the clutch in the event the motion of the feeler is prematurely arrested.

19. In a punching or stamping machine, the combination of the following elements to wit: a reciprocating cross head provided with a plunger; an opposed plunger in alinement with the first named plunger; a cross head connected on opposite sides of said plungers with the first named cross head; and a tripping latch carried by the second cross head beneath and in alinement with the second plunger.

20. In a punching or stamping machine provided with a die, a reciprocatory plunger and actuating mechanism for the latter, and in combination therewith, a reciprocatory feeler coupled with and deriving motion from the plunger actuating mechanism through transmitting devices including a driving shaft, a revoluble cam and a yielding coupling permitting retardation of the cam relatively to the driving shaft.

21. In a punching or stamping machine provided with a reciprocatory plunger and actuating mechanism therefor including a driving clutch, and in combination therewith, movable feeler, actuating devices for said feeler connected with and deriving motion from the plunger actuating mechanism and including a driving shaft, a yielding connection between said shaft and feeler, and means controlled by said yielding connection for opening the clutch.

22. In a punching or stamping machine, the combination of the following elements, to wit: a reciprocatory plunger and complemental die; a reciprocatory carrier for delivering a blank to and receiving it from the die; a receiving galley provided with a laterally movable section at the entrance thereto adapted to receive the blank from the carrier and translate it into a position for observation; and a pusher registering with said movable section when swung away from the galley, for ejecting a blank from said movable section.

23. In a punching or stamping machine, the combination of the following elements, to wit: a reciprocatory plunger; a reciprocatory blank carrier; a receiving galley provided with a movable section at the entrance thereof; and a pusher located adjacent the path of said movable section remote from the galley, said pusher being provided with controllable means for varying its excursions and operating to either position a blank in said movable section or to discharge it therefrom.

24. In a punching or stamping machine provided with a reciprocatory plunger, a reciprocatory blank carrier equipped with an ejector and actuating mechanism common to said plunger, carrier and ejector, and in combination therewith, a manually controlled actuating device, and means for automatically coupling the latter with the carrier-pusher at a predetermined point in the movement of said carrier.

25. In a punching or stamping machine, the combination of the following elements, to wit: a reciprocatory plunger; a die provided with an ejector: a blank feeding mechanism including supply and receiving galleys, an ejector for the supply galley, a reciprocatory carrier provided with two blank holders each equipped with an ejector, the one delivering to the die and the other to the receiving galley; and an actuating mechanism coupled with said plunger, ejectors and carrier for automatically bringing the same into action in the required sequence, substantially as described.

26. In a punching or stamping machine, the combination of the following elements, to wit: a die; opposed plungers; supply and receiving galleys; a reciprocatory carrier provided with two blank holders adapted to register with the receiving and supply galleys, respectively, when in one position of adjustment; and automatic actuating devices for said plungers and carrier operating to present first one and then the other blank holder to the die and subsequently present said holders to the supply and receiving galleys.

27. In a punching or stamping machine, the combination of the following elements, to wit: a die; opposed plungers working in said die; supply and receiving galleys; a reciprocatory carrier provided with two blank holders adapted to register with the receiving and supply galleys when in one position of adjustment; a feeler supported to move in unison with and independently of the carrier and forming a part of one of the blank holders thereof; and an actuating mechanism connecting the plungers, carrier and feeler for automatic action including a driving clutch controlled by the feeler.

28. In a punching or stamping machine, provided with a reciprocatory plunger and actuating devices therefor including a driving clutch and means for closing the latter, and in combination therewith, punch inserting and removing means movable into and out of coöperative relation with the plunger, and automatic locking means for the driving clutch controlled by said punch inserting and removing means.

29. In a punching or stamping machine provided with opposed plunger and die and a reciprocatory carrier intermediate said plunger and die, and in combination therewith, a receiving galley provided with a movable section at the entrance thereof, means for discharging a contained blank from the carrier and depositing the same within said movable section, and controllable means for shifting said movable section clear of the plunger to expose the contained blank.

30. In a punching or stamping machine provided with opposed plunger and die and a reciprocatory carrier movable between said plunger and die, and in combination therewith, a receiving galley provided with a movable entrance section next the die, means for discharging a contained blank from the carrier and depositing the same in said movable section, controllable means for shifting said movable section to expose a contained blank, and controllable ejecting means for ejecting the blank from said movable section when withdrawn from the galley.

FRANK HINMAN PIERPONT.

Witnesses:
  H. D. JAMESON,
  R. M. ABRAMS.